Patented June 6, 1933

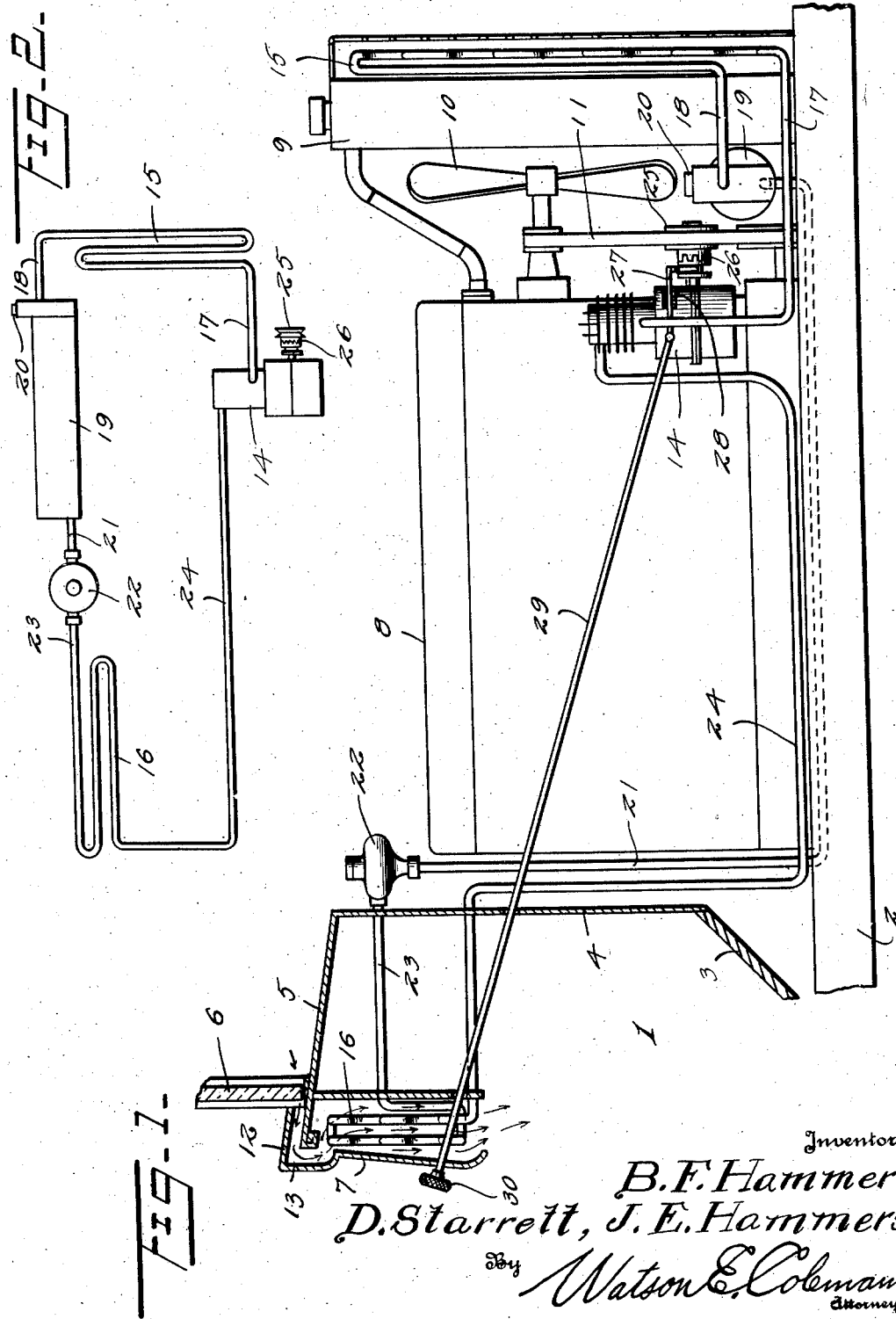

1,913,273

UNITED STATES PATENT OFFICE

BURT F. HAMMERS, DELBERT STARRETT AND JIMMIE E. HAMMERS, OF LAWRENCE, KANSAS

COOLING APPARATUS FOR PASSENGER COMPARTMENTS OF MOTOR VEHICLES

Application filed October 27, 1931. Serial No. 571,424.

This invention has for one of its objects to render automobile more comfortable in warm weather, and to attain this end comprehends the cooling of the passenger compartments of automobiles through the medium of a mechanical refrigerating apparatus.

The invention has for a further object to provide an automobile cooling apparatus of the character stated which shall embody an evaporator arranged in uncovered condition in the passenger compartment of the automobile.

The invention has for a further object to provide an automobile cooling apparatus of the character stated which shall embody an evaporator arranged in uncoveerd condition close to a ventilator of the automobile so as to cool the air as it enters the automobile.

The invention has for a further object to provide an automobile cooling apparatus of the character stated which shall embody a compressor mounted upon and operated by the engine of the automobile, a condenser in the form of a coil arranged to be cooled by the engine fan and connected at one end to the compressor side of the compressor, a compression and storage tank for the refrigerant connected at one end to the other end of the condenser coil and arranged to be cooled by the engine fan, an evaporator in the form of a coil connected at one end to the other end of the tank and connected at the other end to the vacuum side of the compressor, an expansion valve located between the tank and coil, and means for controlling the operation of the compressor.

The invention is hereinafter more fully described and claimed, and illustrated in the accompanying drawing, wherein:—

Figure 1 is a view partly in side elevation and partly in vertical section illustrating the application of the cooling apparatus to an automobile, and Figure 2 is a diagrammatic view of the cooling apparatus.

Referring in detail to the drawing, 1 designates the passenger compartment of an automobile of any well-known construction, 2 designates the frame, 3 the foot board, 4 the dash, 5 the cowl, 6 the windshield, 7 the instrument board, and 8 the engine of the automobile. 9 designates the radiator and 10 the fan of the cooling system of the engine, and 11 designates the belt through the medium of which the fan is driven. The upper portion of the instrument board 7 extends above and is spaced from the rear edge of the cowl 5, and is provided at said edge thereof with a forwardly directed flange 12 which overlies and is spaced from the cowl, to provide a ventilating passage 13 which is under the control of the windshield 6. When the windshield 6 is closed the ventilating passage 13 is closed, and when the windshield is open the ventilating passage is open. These parts of an automobile are shown for the purpose of illustrating the application of the cooling apparatus, and as they are of well-known construction a further description of the same is deemed unnecessary.

The cooling apparatus comprises a compressor 14 mounted upon the motor 8 and operated thereby, a condenser coil 15 mounted in front of the radiator 9 and fan 10 to be cooled by the latter, and an evaporator or cooling coil 16 mounted in the passenger compartment 1. The evaporator or cooling coil 16 is uncovered, and while it is shown located forwardly of the instrument board 7 in the path of the air entering the automobile by way of the ventilating passage 13 it may be arranged at any other convenient point in the passenger compartment 1 of the automobile. If desired a number of evaporating or cooling coils may be employed, and when a number of such coils are employed they may be arranged at any convenient points within the passenger compartment 1.

One end of the condenser coil 15 is connected by a pipe 17 to the compression side of the compressor 14, and the other end of this coil is connected by a pipe 18 to one end of a compression and storage tank 19 which is located rearwardly and extends transversely of the radiator 9 in position to be cooled by the engine fan 10. The tank 19 is provided for the reception of the liquid refrigerant, and is provided with a filler plug 20. The other end of the tank 19 is connected by a pipe 21 to an expansion valve 22 which is secured to the front side of the cowl 5 above the engine 8 and which is connected to one end of the evaporating or cooling coil 16 by a pipe 23. The other end of this coil is connected by a pipe 24 to the vacuum side of the compressor 14.

The compressor 14 is preferably spaced from the fan belt 11 through the medium of a pulley 25 secured to the motor of the compressor and arranged in dragging relation to the belt. The pulley 25 is connected to the shaft of the compressor 14 by a clutch 26 to the end that the pulley may be engaged with or disengaged from the shaft. The clutch 26 is under the control of manually operable means which comprises a forked rod 27 engaging the movable member of the clutch and slidably mounted in a guide 28 carried by the compressor 14, and a rod 29 extending rearwardly from the rod 27 to and through the instrument board 7, the rod 29 being provided at its rear end with a knob 30 through the medium of which it may be moved forwardly to effect the operation of the clutch 26 in a manner to secure the pulley 25 to the shaft of the compressor 14 and through the medium of which it may be moved rearwardly to effect the operation of the clutch in a manner to disengage the pulley from the shaft.

In practice, when it is desired to bring about the operation of the apparatus and thus render the passenger compartment of the automobile comfortable in warm weather, it is only necessary to move the rod 29 forwardly with the result that the pulley 25 is engaged with the shaft of the compressor 14. The consequent operation of the compressor 14 forces the liquid refrigerant into the condenser coil 15 by way of the pipe 17. The refrigerant flows from the condenser coil 15 by way of the pipe 18 into the compression and storage tank 19 which, together with the condenser coil, is cooled by the fan 10. The refrigerant flows from the compression and storage tank 19 by way of the pipe 21 into the expansion valve 22, and it flows from the valve by way of the pipe 23 into the evaporating or cooling coil 16.

The refrigerant flows from the evaporating or cooling coil 16 by way of the pipe 24 to the vacuum side of the compressor 14. The passage of the refrigerant through the evaporating or cooling coil 16 lowers the temperature of this coil sufficiently to maintain the passenger compartment of the automobile comfortable in warm weather. The location of the evaporating or cooling coil 16 in the path of the air flowing into the automobile through the ventilating passage 13 enables the passenger compartment of the automobile to be maintained at low temperature by a single coil, and furthermore allows the temperature of the automobile to be controlled by opening and closing the windshield 6. If desired the compressor 14 may be operated from the generator or any other part driven by the engine 8, and also if desired any well-known form of temperature control means may be employed for the purpose of regulating the operation of the compressor 14 and thus enable the temperature of the passenger compartment of the automobile to be maintained at a uniform degree. When it is desired to stop the compressor 14 it is only necessary to move the rod 29 rearwardly which actuation of the rod disengages the pulley 25 from the shaft of the compressor.

While we have described the principle of the invention, together with the structure which we now consider the preferred embodiment thereof, it is to be understood that the structure shown is merely illustrative and that such changes may be made, when desired, as fall within the scope of the invention as claimed.

What is claimed is:—

1. In an automobile having a ventilator arranged in a position within the interior of the vehicle for opening and closing thereof simultaneously with the opening and closing of the vehicle windshield, a cooling coil within the ventilator, and a cooling unit operatively connected with the vehicle engine and with the coil.

2. The combination with a vehicle windshield and dashboard, of a ventilator formed with the dashboard and having an opening confronting the windshield, and a cooling means within the ventilator.

3. The combination with a vehicle windshield, a vehicle body and a dashboard, of a ventilator formed with the dashboard and having an intake opening confronting the windshield, and an outlet communicating with the interior of the vehicle and a cooling means within the ventilator.

4. The combination with a vehicle windshield, a vehicle body and a dashboard, of a ventilator disposed adjacent the dashboard and having an intake opening confronting the ventilator and controlled by movement of the windshield into open or closed position, and an outlet communicating with the interior of the vehicle, a cooling means within the ventilator and a cooling unit operatively connected with the vehicle engine and the cooling means.

5. The combination with a vehicle windshield, a vehicle body and a dashboard, of a ventilator having an intake opening confronting the windshield, the passage of air into the intake opening being controlled by movement of the windshield into open or closed position, a cooling means within the ventilator, said ventilator having a discharge opening communicating with the interior of the vehicle, a cooling unit operatively connected with the vehicle engine and a cooling means and clutch means operable from within the vehicle to permit coupling or uncoupling of the cooling unit relative to the vehicle engine.

In testimony whereof we hereunto affix our signatures.

BURT F. HAMMERS.
DELBERT STARRETT.
JIMMIE E. HAMMERS.